(12) United States Patent
Bense et al.

(10) Patent No.: US 8,825,278 B2
(45) Date of Patent: Sep. 2, 2014

(54) SYSTEM FOR DETECTING THE FIRST SIGNS OF A MALFUNCTION OF AN AIRCRAFT ENGINE VALVE

(71) Applicant: SNECMA, Paris (FR)

(72) Inventors: William Bense, Melun (FR); Jean-Yves Picart, Dammarie-les-Lys (FR)

(73) Assignee: SNECMA, Paris (FR)

( * ) Notice: Subject to any disclaimer, the term of this patent is extended or adjusted under 35 U.S.C. 154(b) by 7 days.

(21) Appl. No.: 13/774,065

(22) Filed: Feb. 22, 2013

(65) Prior Publication Data

US 2013/0226395 A1  Aug. 29, 2013

(30) Foreign Application Priority Data

Feb. 24, 2012 (FR) ...................................... 12 51705

(51) Int. Cl.
    *G01M 17/00* (2006.01)
(52) U.S. Cl.
    USPC ........................................ 701/32.9; 761/100
(58) Field of Classification Search
    CPC ...................................................... B64D 45/00
    USPC ............. 701/29.1, 29.7, 29.9, 30.2, 100, 32.9
    See application file for complete search history.

(56) References Cited

U.S. PATENT DOCUMENTS

| 5,463,865 | A | 11/1995 | Smith |
| 7,020,595 | B1 * | 3/2006 | Adibhatla et al. ................ 703/7 |
| 7,959,109 | B2 | 6/2011 | Dasilva et al. |
| 2007/0068225 | A1 | 3/2007 | Brown |

FOREIGN PATENT DOCUMENTS

| EP | 0 315 391 A2 | 5/1989 |
| WO | WO 2009/072487 A1 | 6/2009 |
| WO | WO 2012/120229 A1 | 9/2012 |

OTHER PUBLICATIONS

Preliminary Search Report issued Dec. 12, 2012 in French Application No. 1251705.

* cited by examiner

*Primary Examiner* — Thomas Black
*Assistant Examiner* — Luke Huynh
(74) *Attorney, Agent, or Firm* — Oblon, Spivak, McClelland, Maier & Neustadt, L.L.P.

(57) ABSTRACT

A method and a system for detecting the first signs of malfunction of an aircraft engine valve, including an acquisition device to acquire the output pressure measurements of the valve, and contextual and command data of the valve, a processor to define a set of indicators of the first signs of malfunction, according to the output pressure measurements and the contextual and command data. A set of estimators corresponding to the set of indicators of the first signs of a malfunction, is determined using a previously produced regression model. At least one distance between the set of indicators and the set of estimators is computed. The distance is compared to a threshold of the first signs of a malfunction, in order to detect the first signs of malfunction of the said valve.

10 Claims, 2 Drawing Sheets

SYSTEM FOR DETECTING THE FIRST SIGNS OF A MALFUNCTION OF AN AIRCRAFT ENGINE VALVE

TECHNICAL FIELD

The present invention relates to the field of systems for supervising an aircraft engine valve and, more specifically, detecting first signs of a malfunction of an NAI-type valve.

STATE OF THE PRIOR ART

An aircraft engine includes multiple valves required for controlling the flow rates of different fluids flowing in the engine. The valves generally include position measuring means (position sensors or switches), enabling their working condition to be supervised. Supervision then consists in comparing the ordered position of the valve with the position detected by the position sensors. A failure in, or damage to, one or more position sensors generates alert messages which can lead to a period of immobilisation, of greater or lesser length, of the aircraft for a maintenance intervention.

In addition, certain valves such as NAI (Nacelle Anti-Icing) valves do not include position detection means, and it is then difficult to supervise their satisfactory working condition. Indeed, malfunction detection is particularly difficult when it is not possible to observe the malfunction directly, but only its effects.

NAI valves are used in pneumatic de-icing systems to prevent the nacelle becoming iced. If the NAI valve remains blocked in an open position there is a risk that the de-iced components will overheat. On the contrary, if the valve remains blocked in a closed position the icing of the nacelle may damage the engine. To prevent these problems it is advantageous to detect the first signs of malfunction of these valves before they remain blocked.

The object of the present invention is consequently to propose a detection system and method which is simple to implement, and which can detect, accurately and reliably, the first signs of a malfunction in an aircraft engine valve.

DESCRIPTION OF THE INVENTION

The present invention is defined by a system for detecting the first signs of malfunction of an aircraft engine valve, including:

acquisition means to acquire the output pressure measurements of the said valve, and contextual and command data of the said valve, processing means to define a set of indicators of the first signs of malfunction, according to the said output pressure measurements and the said contextual and command data, processing means to determine a set of estimators corresponding to the said set of indicators of the first signs of a malfunction, using a previously produced regression model, processing means to compute at least one distance between the said set of indicators and the said set of estimators, and processing means to compare the said at least one distance to at least one threshold of the first signs of a malfunction, in order to detect the first signs of malfunction of the said valve.

The system of the present invention is very easy to implement with a minimal number of computation operations, and enables the first signs of malfunction of the valve to be detected principally on the basis of the output pressure measurement.

The contextual data may include ambient pressure data, valve feed pressure data, and temperature measurements. The command data may include moments when the said valve is ordered to open and to close.

Acquisition of the contextual and command data does not require additional means, but enables the definition of the indicators to be refined. Indeed, the contextual data is easily available from the supervision system already present in the aircraft, and the command data is also available from an on-board computer. In addition, the contextual data is used to standardise the indicators, to enable the detection system to operate identically, whatever the acquisition conditions may be.

The said set of indicators of the first signs of a malfunction advantageously include one or more indicators among the following indicators:

opening time of the said valve, determined by the period between the instant when the valve is given an order to open, and the instant when the output pressure confirms a predetermined function indicative of an open valve, closure time of the said valve, determined by the period between the instant when the valve is given an order to close, and the instant when the output pressure is approximately equal to the ambient pressure, open state of the said valve, determined by a comparison between the output pressure and the said predetermined function indicative of an open valve, and closed state of the said valve, determined by a comparison between the output pressure and the ambient pressure.

These indicators envisage all the valve's operating cases, and are thus very relevant to detect the first signs of a malfunction.

The processing means are advantageously configured to determine the set of estimators by computing, for each indicator of the first signs of a malfunction, a corresponding estimator, according to the other indicators, and to at least one contextual data element, in accordance with the said regression model.

The estimators enable the indicators' natural changes to be predicted, whilst eliminating the dependencies with regard to the context, and managing the stochastic interdependency relationships between the indicators themselves.

The processing means are advantageously configured to compare the said at least one distance to at least one anomaly threshold if the threshold for the first signs of a malfunction is exceeded.

This enables a failure of the valve to be detected.

The said at least one distance of the first signs of a malfunction is advantageously a single global Mahalanobis distance defined between an estimator vector formed by the set of indicators and an indicator vector formed by the set of indicators of the first signs of a malfunction.

According to the first embodiment the Mahalanobis distance is a global distance which takes into account the correlation between all the indicators, and enables the similarity between the indicators derived from the measurements and the estimators predicted by the model to be determined in a robust manner.

According to a second embodiment, the processing means are configured to compute a set of individual distances, where each is defined between each indicator and its corresponding estimator, and the processing means are configured to compare the set of distances to a corresponding set of thresholds of the first signs of a malfunction.

This for example enables the Euclidean distance between each indicator and its corresponding estimator to be determined in a simple manner, in order, possibly, to seek to find the correlations between the different indicators. This enables the detection sensitivity to be increased, and possibly the nature of the first signs of malfunction to be identified.

The said valve is advantageously an NAI valve. This detection system is of particular interest for an NAI valve, since the latter includes no position feedback, and there is therefore no direct means of observing malfunctions.

The invention also includes an aircraft engine, including a detection system according to any of the above characteristics.

The invention also includes a method for detecting the first signs of a malfunction of an aircraft engine, including the following steps:

acquiring output pressure measurements of the said valve, and contextual and command data of the said valve, defining a set of indicators of the first signs of malfunction, according to the said output pressure measurements and the said contextual and command data, determining a set of estimators corresponding to the said set of indicators of the first signs of a malfunction, using a previously produced regression model, computing at least one distance between the said set of indicators and the said set of estimators, and comparing the said at least one distance to at least one threshold of the first signs of a malfunction, in order to detect the first signs of malfunction of the said valve.

BRIEF DESCRIPTION OF THE ILLUSTRATIONS

Other characteristics and advantages of the invention will appear on reading the preferential embodiments of the invention made in reference to the attached figures, among which:

DETAILED ACCOUNT OF PARTICULAR EMBODIMENTS

The concept on which the invention is based relies on the construction of relevant indicators for detecting the first signs of a malfunction in practice solely on the basis of the pressure measurement.

Figure 1:
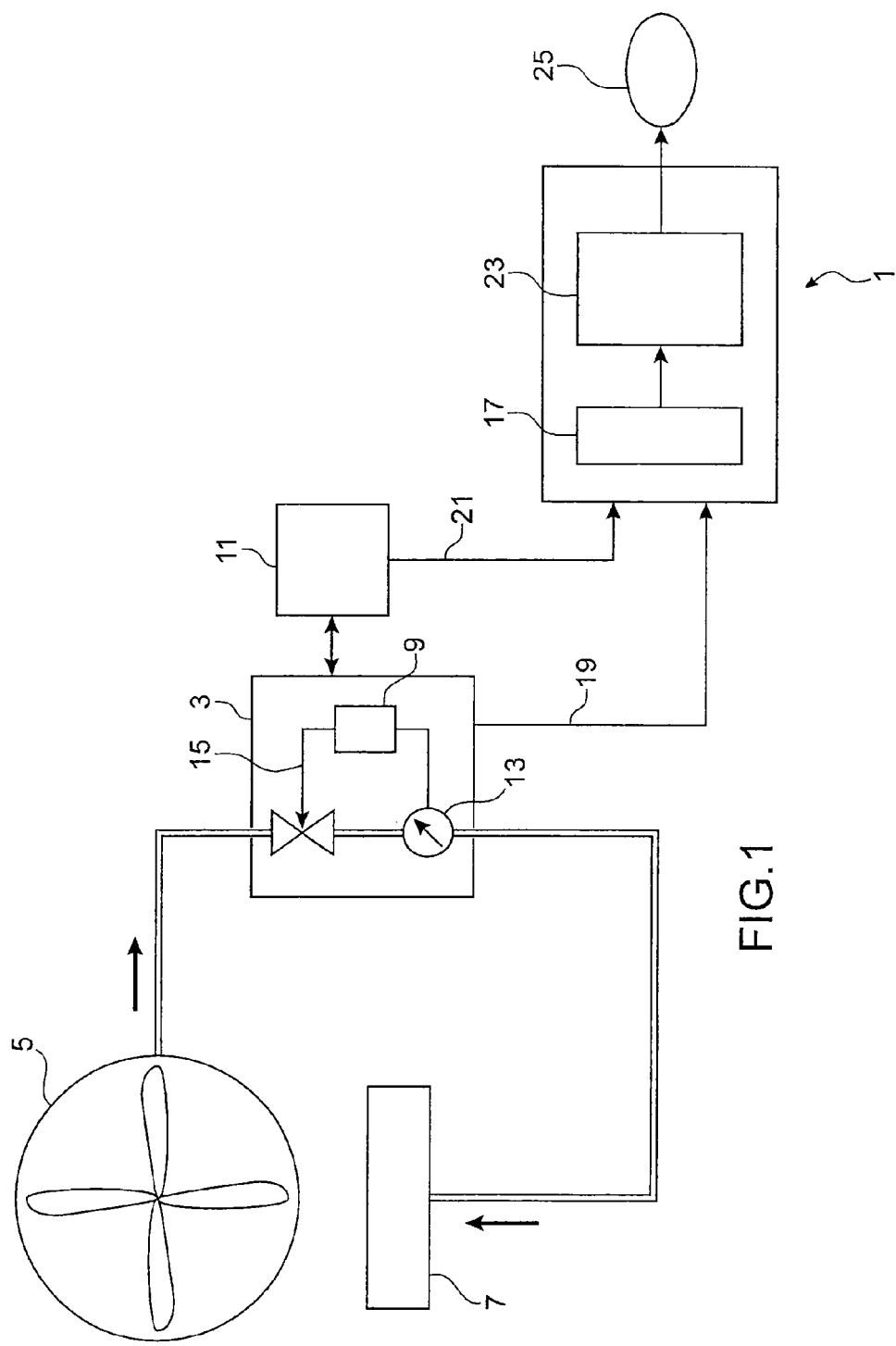
FIG. 1 illustrates schematically a system of detection of the first signs of malfunction of an aircraft engine valve, according to the invention.

FIG. 1 illustrates schematically a system 1 for detecting the first signs of malfunction of an aircraft engine valve 3, according to the invention.

An air sampling valve 3 of the PRSOV (Pressure Regulating Shut Off Valve) type samples the air from compressor 5 of the engine and then conveys it to other equipment of the aircraft. For example, in the case of an NAI valve, the hot air sampled in compressor 5 is conveyed towards means 7 for de-icing the aircraft engine nacelle.

It will be noted that during normal operation this kind of butterfly control type valve has no intermediate position: the position is either open or closed.

Valve 3 habitually includes command means 9 able to control and regulate the open or closed position of valve 3. The position of valve 4 is activated by command means 9 according to the signals received from an on-board computer 11 and/or from the controls which can be operated by the crew.

In addition, valve 3 includes a pressure sensor 13 which measures the output pressure provided by valve 3. The pressure reading is sent via a control loop 15 to control means 9, which then adjust the position of valve 3 according to the pressure measurement, in order to maintain a suitable output pressure.

In accordance with the invention, detection system 1 is configured to use the output pressure measurement in order to detect the first signs of a malfunction of valve 3.

More particularly, detection system 1 includes acquisition means 17 to acquire the output pressure values (arrow 19) of the valve measured by the pressure sensor, together with contextual and valve control data (arrow 21).

The contextual data may include data concerning the ambient pressure, the feed pressure of valve 3 and the temperature measurements, for example in the feed of valve 3.

As an example, contextual data may be obtained from a supervision system and/or a pre-existent on-board computer 11. Indeed, the aircraft habitually includes a supervision system (not represented) which measures and records chronological measurements including engine operating data and contextual data, in order to supervise the engine's satisfactory operation.

As a variant, the contextual data can be obtained directly from specific sensors (not represented), configured to measure the parameters of this contextual data.

The control data also includes the instants when orders to open and close valve 3 are given, for example, from on-board computer 11.

Detection system 1 also includes processing means 23 to define a set of indicators of the first signs of malfunction $y_1, \ldots y_j, \ldots y_m$, according to the output pressure measurements and the contextual and command data. It will be noted that the set of indicators can include a single relevant indicator, or multiple relevant indicators.

A first indicator may relate to the closure time of valve 3 which can be determined by the period between the instant when the order to close valve 3 is given and the instant when the output pressure is approximately equal to the ambient pressure. It is thus possible to know whether the closure time is in accordance with a normal predefined closure time.

A second indicator concerns the closed state of valve 3 in order to ensure that the valve is hermetic when it is closed. This can be determined by a comparison between the output pressure and the ambient pressure. The ratio between the output pressure and the ambient pressure must indeed be close to one for hermetic closing.

It will be noted that after the command to close valve 3 there is a wait for a certain time greater than the valve's normal closure time in order to take account of the output pressure measurements, in order to be certain that a valve operating normally has had the necessary time to close. The output pressure is advantageously measured throughout a predetermined period in order to compute an average of these measurements.

Figure 2:
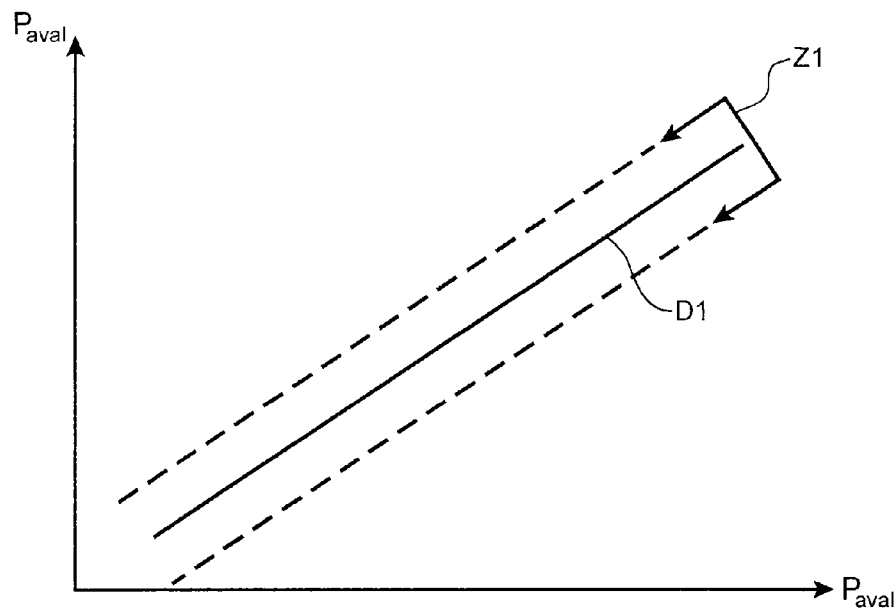
FIG. 2 is a graph illustrating the output pressure as a function of ambient pressure for a normally closed valve.

FIG. 2 is a graph illustrating output pressure $P_{downstream}$ as a function of ambient pressure $P_{amb}$ for a normally closed valve. Indeed, in the case of a hermetically closed valve, output pressure $P_{downstream}$ is a linear function represented by a straight line D1 of nominal pressure passing through the origin. Output pressure $P_{downstream}$ is normally almost equal to ambient pressure $P_{amb}$. Straight line D1 is also framed by an acceptable dispersion area Z1 due to an inaccuracy of the measurement, within which valve 3 can still be considered to be hermetic.

However, output pressure measurements $P_{downstream}$ outside dispersion area Z1 are indicative of the first signs of a malfunction, or even of an actual malfunction. In particular, measurements above straight line D1 indicate that valve 3 is not hermetically closed, and that leaks are present the size of which depends on the distance of the measurements relative to nominal straight line D1.

A third indicator concerns the opening time of valve 3. This opening time is determined by the measurement of the period between the instant when valve 3 is given an order to open, and the instant when output pressure $P_{downstream}$ confirms a predetermined function indicative of an open valve. This predetermined function depends on the feed pressure.

A fourth indicator concerns the open state of valve 3. This may be determined by a comparison between output pressure $P_{downstream}$ and the said predetermined function indicative of a normally open valve. The comparison may be made by computing the ratio between the measured output pressure and the corresponding theoretical output pressure in accordance with the said predetermined function, given that for normal operation this ratio must be close to one.

As a precaution, and as previously mentioned, there is a wait for a time greater than the opening time of valve 3 before the output pressure measurements are taken into account, in order to be certain that a valve operating normally has had the requisite time to open. Similarly, output pressure $P_{downstream}$ is advantageously measured during a predetermined period in order to compute an average of these measurements.

Figure 3:
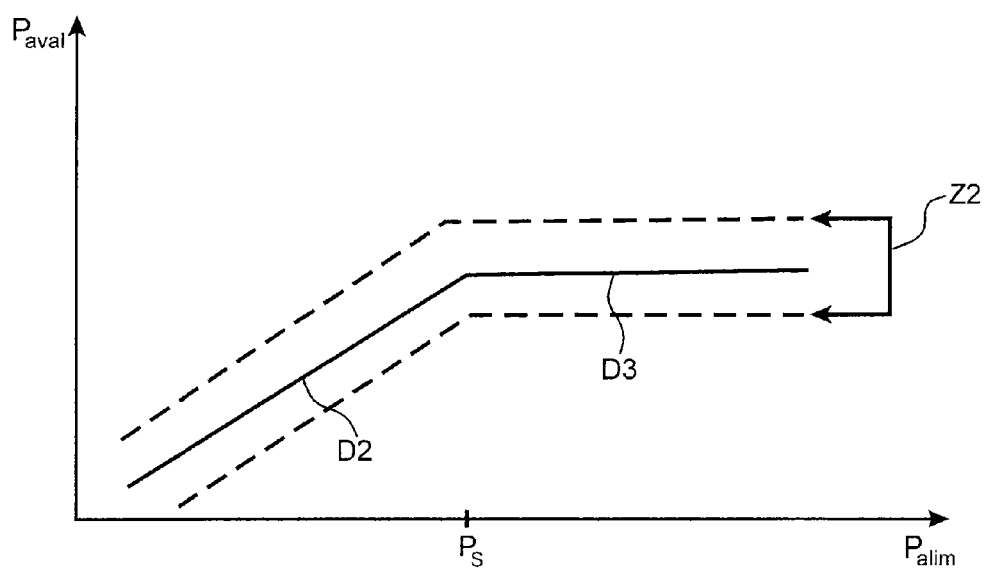
FIG. 3 is a graph illustrating the output pressure as a function of feed pressure for a normally open valve.

FIG. 3 is a graph illustrating output pressure $P_{downstream}$ as a function of feed pressure $P_{feed}$ for a normally open valve. In this case, output pressure $P_{downstream}$ is represented by a predetermined function of the piecewise affine type. The curve of the said predetermined function consists of first and second straight line segments D2 and D3. First straight line segment D2 represents an equality between output pressure $P_{downstream}$ and feed pressure $P_{feed}$ when the latter is less than a predetermined threshold pressure $P_s$. Second straight line segment D3 represents the fact that output pressure $P_{downstream}$ remains stationary at a value equal to predetermined threshold pressure $P_s$ when feed pressure $P_{feed}$ is greater than said threshold pressure P. Straight line segments D2 and D3 are framed by a dispersion area Z2, where dispersion is due to inaccurate measurement.

Naturally, in the case of a normally open valve 3, output pressure $P_{downstream}$ is higher than ambient pressure $P_{amb}$, as illustrated in the graph of FIG. 3. However, if the output pressure measurements are close to ambient pressure, it can be deduced that there is a load loss due to poor opening of the valve.

Processing means 23 are also configured to determine a set of estimators $\tilde{y}_1, \ldots \tilde{y}_j, \ldots, \tilde{y}_m$ corresponding to the said set of indicators of the first signs of a malfunction according to a previously produced regression model.

The regression model can be of the GLM (General Linear Model) type, or again of the LARS (Least Angle Regression) type, determined beforehand either on a test bench when the engine is pending acceptance, or during the engine's maturation or learning phase.

For each indicator of the first signs of a malfunction $y_j$, this regression model enables a corresponding indicator $\tilde{y}_j$ to be produced depending on all the other indicators of the first signs of malfunction $(y_1, \ldots, y_{j-1}, y_{j+1}, \ldots y_m)$ and on one or more elements of contextual data $(c_1, \ldots, c_n)$ such that:

$$\tilde{y}=f(c_1,\ldots,c_n,y_1,\ldots,y_{j-1},y_{j+1},\ldots,y_m)$$

It is thus possible to form a set of estimators $\tilde{y}_1, \ldots \tilde{y}_j, \ldots \tilde{y}_m$ which are independent with regard to the external context.

Processing means 23 are then configured to compute at least one distance between set of indicators $y_1, \ldots, y_j, \ldots y_m$ and corresponding set of estimators $\tilde{y}_1, \ldots, \tilde{y}_j, \ldots, \tilde{y}_m$.

Finally, processing means 23 are configured to compare the said at least one distance to at least one threshold of the first signs of a malfunction, in order to detect the first signs of malfunction of valve 3.

According to a first embodiment, the said at least one distance of the first signs of a malfunction is a single global Mahalanobis distance $d_M$ defined between an estimator vector $\tilde{Y}=(\tilde{y}_1,\ldots,\tilde{y}_j,\ldots,\tilde{y}_m)$ formed by the set of estimators, and an indicator vector $Y=(y_1,\ldots,y_j,\ldots,y_m)$ formed by the set of indicators of the first signs of a malfunction in the following manner:

$$d_M^2=(\tilde{Y}-Y)^T\Sigma^{-1}(\tilde{Y}-Y)$$

Global Mahalanobis distance $d_M$, which takes into account the correlation between all the indicators, can be considered to be a global score which is then compared to a threshold at which the first signs of a malfunction are triggered.

If the threshold for the first signs of a malfunction is exceeded, an alert 25 for detection of the first signs of a malfunction is activated by processing means 23. In addition, the global distance can then be compared to the second threshold, or anomaly threshold, in order to detect whether the valve is already malfunctioning, and to trigger a malfunction alert if the anomaly threshold is exceeded.

According to a second embodiment, processing means 23 are configured to compute a set of individual distances, where each is defined between each indicator and its corresponding estimator. The Euclidean distance $d(\tilde{y}_j, y_j)$ between each indicator $y_j$ and its corresponding estimator $\tilde{y}_j$ can for example be used to form a set of distances. After this, each distance of the set of distances is compared to a corresponding threshold of a set of thresholds of the first signs of a malfunction.

If the threshold of the first signs of a malfunction is exceeded, an alert for detection of the first signs of a malfunction can be triggered, and the distance exceeding the corresponding threshold is then compared to a second threshold (or anomaly threshold) representative of a failure.

It will be noted that, according to the second embodiment, the set of distances can be used to seek correlations by grouping the different indicators together, for example in pairs. For example, a correlation may be sought between the opening time and the closure time, or the correlation may be sought involving the opening time and the output pressure when valve 3 is open. This enables the detection sensitivity to be increased, and possibly the nature of the first signs of malfunction to be identified.

Detection system 1 can be integrated in a specific unit, or form part of an existing electronic unit. The acquisition and processing means of an on-board computer 11 in the aircraft or in a computer integrated in the aircraft engine of the EMU (Engine Monitoring Unit) type may be used to operate detection system 1 according to the invention. In particular, computer 11 can be used to execute a computer program recorded in storage means of the computer, including code instructions for implementing the detection method according to the invention.

The invention claimed is:

1. A system for detecting the first signs of a malfunction of an aircraft engine valve, comprising:
   an acquisition device to acquire the output pressure measurements of said valve, and contextual and command data of said valve,
   a processor configured to define a set of indicators of the first signs of malfunction, according to said output pressure measurements and said contextual and command data, wherein said processor is further configured to determine a set of estimators corresponding to said set of indicators of the first signs of a malfunction, using a previously produced regression model, said processor being further configured to compute at least one distance between said set of indicators and said set of estimators, and said processor being further configured to compare said at least one distance to at least one threshold of the first signs of a malfunction, in order to detect the first signs of malfunction of the said valve.

2. A system according to claim 1, wherein the contextual data includes data of ambient pressure, of valve feed pressure and of temperature measurements, and wherein the command data includes instants when the orders are given to open and close said valve.

3. A system according to claim 2, wherein said set of indicators of the first signs of a malfunction includes one or more indicators among the following indicators:

opening time of said valve, determined by the period between the instant when the valve is given an order to open, and the instant when the output pressure confirms a predetermined function indicative of an open valve, closure time of said valve, determined by the period between the instant when the valve is given an order to close, and the instant when the output pressure is approximately equal to the ambient pressure, open state of said valve, determined by a comparison between the output pressure and said predetermined function indicative of an open valve, and closed state of said valve, determined by a comparison between the output pressure and the ambient pressure.

4. The system according to claim 1, wherein the processor is configured to determine the set of estimators by computing, for each indicator of the first signs of a malfunction, a corresponding estimator, according to the other indicators, and to at least one contextual data element, in accordance with said regression model.

5. A system according to claim 1, wherein the processor is configured to compare said at least one distance to at least one anomaly threshold if the threshold for the first signs of a malfunction is exceeded.

6. A system according to claim 1, wherein said at least one distance of the first signs of a malfunction is a single global Mahalanobis distance defined between an estimator vector formed by the set of indicators and an indicator vector formed by the set of indicators of the first signs of a malfunction.

7. A system according to claim 1, wherein the processor is configured to compute a set of individual distances, where each is defined between each indicator and its corresponding estimator, and wherein the processor is configured to compare the set of distances to a corresponding set of thresholds of the first signs of a malfunction.

8. A system according to claim 1, wherein said valve is an NAI-type value.

9. An aircraft engine comprising a detection system according to claim 1.

10. A method for detecting the first signs of a malfunction of an aircraft engine valve, said method comprising the following steps:

acquiring output pressure measurements of said valve, and contextual and command data of said valve, defining a set of indicators of the first signs of malfunction, according to said output pressure measurements and said contextual and command data, determining a set of estimators corresponding to said set of indicators of the first signs of a malfunction, using a previously produced regression model, computing at least one distance between said set of indicators and said set of estimators, and comparing said at least one distance to at least one threshold of the first signs of a malfunction, in order to detect the first signs of malfunction of the said valve.

* * * * *